UNITED STATES PATENT OFFICE.

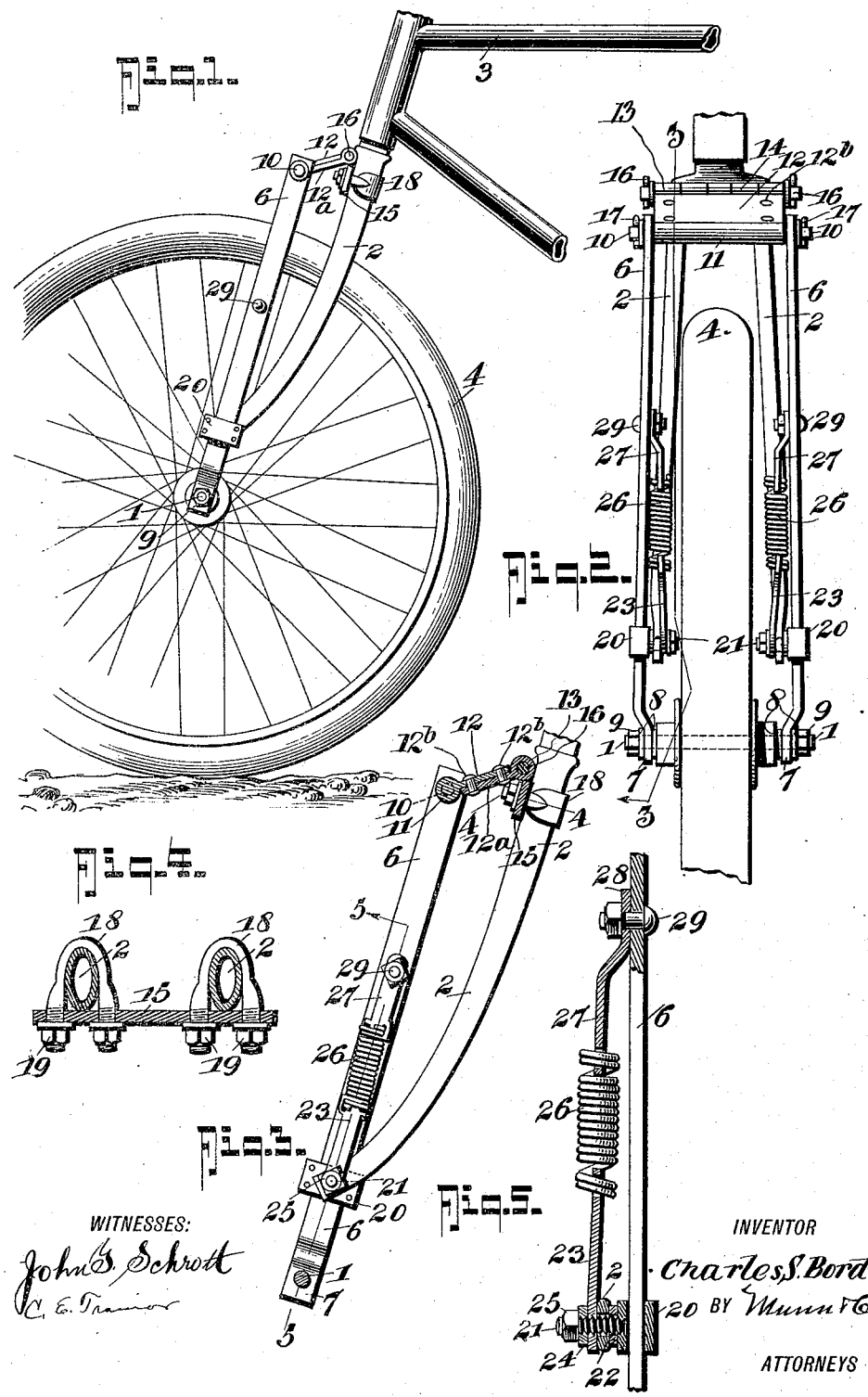

CHARLES S. BORDNER, OF CIRCLEVILLE, KANSAS.

SHOCK-ABSORBER.

1,191,656.
Specification of Letters Patent.
Patented July 18, 1916.

Application filed October 26, 1915. Serial No. 58,000.

*To all whom it may concern:*

Be it known that I, CHARLES S. BORDNER, a citizen of the United States, and a resident of Circleville, in the county of Jackson and State of Kansas, have invented a new and useful Improvement in Shock-Absorbers, of which the following is a specification.

My invention is an improvement in shock absorbers for use with bicycles and like vehicles, wherein mechanism is provided of the character specified capable of attachment to existing bicycles without material changes, and adapted to be arranged between the arms of the front fork and the front axle for absorbing the shock and jar of the front wheel to prevent the transmission of the same to the rider and to the frame of the vehicle.

In the drawings: Figure 1 is a side view of a portion of a bicycle provided with the improvement, Fig. 2 is an enlarged partial front view, Fig. 3 is a section on the line 3—3 of Fig. 2, looking in the direction of the arrow adjacent to the line, and Figs. 4 and 5 are sections on the lines 4—4 and 5—5, respectively of Fig. 3, the latter figure looking in the direction of the arrow adjacent to the line.

The present embodiment of the invention is shown in connection with the front axle 1, and the arms 2 of the front fork of a bicycle frame indicated at 3, the axle carrying the usual wheel 4. As is known in the usual form of bicycle the arms 2 of the front fork are mounted on the axle and support the same. The ends of the axle are threaded, and with the attachment the shock absorbing mechanism is arranged between the arms 2 and the axle. The said mechanism comprises a pair of bars 6, which are arranged on opposite sides of the wheel, the lower ends 7 of the bars being offset inwardly and having openings for receiving the ends of the axle. Washers 8 are arranged on opposite sides of the inwardly offset ends, and nuts 9 are threaded on to the axle outside of the outermost washers. These arms extend upwardly in front of the arms 2 of the fork and they are connected at their upper ends by a pin 10. This pin is passed through registering openings in the arms and through a bearing sleeve 11 on a hinge plate 12—12$^a$, to be later described, arranged between the arms in front of the front fork. This plate as shown in Fig. 3 is composed of superposed sections 12 and 12$^a$ secured together by rivets 12$^b$ or the like, and the bearing sleeve 11 is on the section 12. The section 12$^a$ is also provided with spaced bearings 13 for a purpose to be presently described, and it will be noticed from an inspection of Fig. 3 that the plates 12 and 12$^a$ are staggered with respect to each other, so that each bearing 11 and 13 extends beyond the adjacent edge of the other plate, and the bearings 13 are adapted to register or aline with other bearings 14 on the upper edge of a cross bar 15, and a pivot pin or pintle 16 is passed through the registering bearings. Cotter pins 17 are passed through the ends of the pintle 16 and through the ends of the pin 10 before mentioned to hold the pins from longitudinal movement in the bearings. This bar 15 is clamped to the arms 2 of the fork by U-shaped clips 18, each comprising a body extending transversely of the adjacent arm and arms passing through openings in the bar 15, and the arms are engaged by washers and nuts 19 on the opposite face of the bar. The bar 15 is thus clamped tightly to the arms of the fork by the clips, and by loosening the nuts the bar may be adjusted vertically. A hinge or swinging connection is thus provided between the upper ends of the bars and the front fork near the connection of the arms 2 with the body. The lower ends of the arms of the front fork are supported by bearing clips 20, each clip embracing the adjacent bar 6, and the clips are slidable on the bars 6. Each clip carries an inwardly extending threaded stem 21, and each arm 2 of the fork has an opening at its lower end as indicated in Fig. 5, for receiving the stem.

A washer 22 is arranged between the arm and the clip, and a spring supporting bar 23 is arranged on the stem outside of the fork arm. Each of the bars 23 has an opening for receiving the stem, and a nut 25 is provided for holding the parts in place, a washer 24 being arranged between the nut and the bar. Each of the bars 23 is connected to one end of a coil spring 26, and the other end of each spring is connected to a second spring supporting bar 27.

The upper end of each of the bars 27 is offset outwardly as indicated at 28 into contact with the inner face of the adjacent bar 6, and a bolt and nut 29 is provided for securing the offset portion of the bar 27 to the bar 6. The bolts are passed through registering openings in the offset portions and in the bars 6 from without inward, and are engaged by the nuts on the inner faces of the offset portions.

Each of the coil springs 26 has eyes at its ends formed by separating two of the coils from the other coils, and these eyes are passed through slots or openings extending transversely of the spring supporting bars. The front fork is thus suspended by the springs 26 at each side. Each of the springs is supported at its upper end by the adjacent bar 6, and its lower end supports the adjacent arm of the front fork. The clips 20 are slidable on the bars 6, and it will be evident that the said springs will absorb any shock or jar that may be imparted to the front wheel.

The bicycle frame 3 and the wheel 4 are of ordinary construction, and it will be evident that the improvement may be connected with existing bicycles without difficulty and without changes in the parts of the bicycle. In order to apply the improvement to an ordinary bicycle the front fork is detached from the front axle and the bars 6 are connected with the axle. The clips 18 are then connected with the arms of the fork near their connection with the body, and the device is ready for operation. The supporting bar 15 provides a firm, rigid, but adjustable support for the inner end of the hinge plate 12—12$^a$. When a jar is imparted to the front wheel the bars 6 will move upward, swinging on the plate 12—12$^a$. The clips 20 may slide downward on the bars 6 until the springs absorb the shock after which the tension of the springs will return the parts to normal position.

I claim:—

1. In combination with the front axle and the front fork of a bicycle, of a pair of slide bars connected at their lower ends to the axle, a plate hinged at one side edge to the upper ends of the bars, said plate being arranged between the bars, a support hinged to the opposite side of the plate and having means for adjustably connecting the same with the arms of the front fork, a clip movably disposed on each slide bar, means in connection with each clip for connecting the same to the adjacent arm of the front fork of the bicycle, and resilient means arranged between each clip and the adjacent slide bar for absorbing shock and preventing the imparting of the shock to the frame of the bicycle, each of the said resilient means comprising a coil spring, spring supporting bars connected with the ends of the spring, one of the said bars being connected at its upper end to the adjacent slide bar and the other of the said bars being connected at its lower end to the adjacent clip.

2. In combination with the front axle and the front fork of a bicycle, of a pair of slide bars connected at their lower ends to the axle, a plate hinged at one side edge to the upper ends of the bars, said plate being arranged between the bars, a support hinged to the opposite side of the plate and having means for adjustably connecting the same with the arms of the front fork, a clip movably disposed on each slide bar, means in connection with each clip for connecting the same to the adjacent arm of the front fork of the bicycle, and resilient means arranged between each clip and the adjacent slide bar for absorbing shock and preventing the imparting of the shock to the frame of the bicycle.

3. In combination with the front axle and the front fork of a bicycle, of a pair of slide bars connected at their lower ends to the axle, a connecting member hingedly connected at one end to the upper ends of said slide bars and at its opposite end to the front fork of the bicycle, clips movably disposed upon the lower portions of the slide bars above the axle and to which the lower ends of the front fork are connected, and springs extending upwardly along the said slide bars and connected at their upper ends thereto, the lower ends of said springs being connected to the said clips, all for the purposes described.

CHARLES S. BORDNER.

Witnesses:
J. T. REUTTER,
FRED. R. NUZMAN.

Copies of this patent may be obtained for five cents each, by addressing the "Commissioner of Patents, Washington, D. C."